United States Patent
Massari et al.

(10) Patent No.: US 11,186,664 B2
(45) Date of Patent: Nov. 30, 2021

(54) PROPYLENE ETHYLENE RANDOM COPOLYMER

(71) Applicant: BASELL POLIOLEFINE ITALIA S.R.L., Milan (IT)

(72) Inventors: Paola Massari, Ferrara (IT); Claudio Cavalieri, Ferrara (IT); Davide Tartari, Ferrara (IT); Tiziana Caputo, Ferrara (IT); Isabella Maria Vittoria Camurati, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 8 days.

(21) Appl. No.: 16/647,672

(22) PCT Filed: Aug. 30, 2018

(86) PCT No.: PCT/EP2018/073313
§ 371 (c)(1),
(2) Date: Mar. 16, 2020

(87) PCT Pub. No.: WO2019/052822
PCT Pub. Date: Mar. 21, 2019

(65) Prior Publication Data
US 2020/0216587 A1 Jul. 9, 2020

(30) Foreign Application Priority Data

Sep. 14, 2017 (EP) ..................................... 17190989
Jun. 13, 2018 (EP) ..................................... 18177535

(51) Int. Cl.
*C08F 210/16* (2006.01)
*C08F 210/06* (2006.01)
*C08F 2/34* (2006.01)
*C08L 23/14* (2006.01)

(52) U.S. Cl.
CPC .............. *C08F 210/06* (2013.01); *C08F 2/34* (2013.01); *C08L 23/142* (2013.01); *C08F 210/16* (2013.01); *C08L 2205/02* (2013.01); *C08L 2207/10* (2013.01)

(58) Field of Classification Search
None
See application file for complete search history.

(56) References Cited

U.S. PATENT DOCUMENTS

2016/0347944 A1\* 12/2016 Wang ................... C08K 5/0083

FOREIGN PATENT DOCUMENTS

| EP | 45977 A2 | 2/1982 |
| EP | 361494 A2 | 4/1990 |
| EP | 728769 A1 | 8/1996 |
| EP | 0782587 B1 | 2/1999 |
| EP | 1272533 A1 | 1/2003 |
| WO | 2015117948 A1 | 8/2015 |

OTHER PUBLICATIONS

Huggins, M.L., J. Am. Chem. Soc., 1942, 64, 2716.
Monomer Sequence Distribution in Ethylene-Propylene Rubber Measured by 13C NMR. 3. Use of Reaction Probability Mode C. J. Carman, R. A. Harrington and C. E. Wilkes, Macromolecules, 1977, 10, 536.
Carbon-13 NMR determination of monomer sequence distribution in ethylene-propylene copolymers prepared with ?-titanium trichloride-diethylaluminum chloride M. Kakugo, Y. Naito, K. Mizunuma and T. Miyatake, Macromolecules, 1982, 15, 1150.
International Search Report and Written Opinion dated Oct. 18, 2018 (Oct. 18, 2018) for Corresponding PCT/EP2018/073313.

\* cited by examiner

Primary Examiner — Richard A Huhn

(57) ABSTRACT

A propylene ethylene copolymer having:
i) xylene soluble fraction at 25° C. ranging from 14 wt % to 27 wt %;
ii) intrinsic viscosity of the fraction soluble in xylene at 25° C. ranging from 1.0 to 2.4 dl/g;
iii) melt flow rate, MFR, ranging from 1.0 g/10 min to 50.0 g/10 min;
iv) an ethylene derived units content ranging from 5.0 wt % to 12.0 wt %;
v) the ethylene derived units content on the fraction insoluble in xylene at 25° C. ranging from 2.5 wt % to 6.0 wt %;
vi) the ethylene derived units content on the fraction soluble in xylene at 25° C. ranging from 15.2. wt % to 30.2 wt %; and
vii) $C^{13}$ NMR sequences PEP measured on the fraction insoluble in xylene at 25° C. ranging from 3.5 mol % to 5.5 mol % and $C^{13}$ NMR sequences PEP measured on the fraction soluble in xylene at 25° C. ranging from 11.0 mol % to 14.2 mol %.

11 Claims, No Drawings

PROPYLENE ETHYLENE RANDOM COPOLYMER

FIELD OF THE INVENTION

In general, the present disclosure relates to the field of chemistry. More specifically, the present disclosure relates to polymer chemistry. In particular, the present disclosure relates to propylene ethylene random copolymer obtained with a gas phase process as well as films and injection-molded articles made therefrom.

BACKGROUND OF THE INVENTION

Isotactic polypropylene is useful in many applications.

For some applications and to improve the properties of the isotactic polypropylene, the crystallinity of the propylene homopolymer is decreased by copolymerization of the propylene with small quantities of ethylene or α-olefins. For some applications, the α-olefins are selected from the group consisting of 1-butene, 1-pentene and 1-hexene. In some instances, the resulting random crystalline propylene copolymers have better flexibility and transparency than homopolymers.

SUMMARY OF THE INVENTION

In a general embodiment, the present disclosure provides a propylene ethylene copolymer having:
i) xylene soluble fraction at 25° C. ranging from 14 wt % to 27 wt %, based upon the total weight of the propylene ethylene copolymer;
ii) intrinsic viscosity of the fraction soluble in xylene at 25° C. ranging from 1.0 to 2.4 dl/g;
iii) melt flow rate, MFR, measured according to ISO 1133 at 230° C. with a load of 2.16 kg, ranging from 1.0 g/10 min to 50 g/10 min;
iv) an ethylene derived units content ranging from 5.0 wt % to 12.0 wt %, based upon the total weight of the propylene ethylene copolymer;
v) the ethylene derived units content on the fraction insoluble in xylene at 25° C. ranging from 2.5 wt % to 6.0 wt %, based upon the total weight of xylene insoluble fraction;
vi) the ethylene derived units content on the fraction soluble in xylene at 25° C. ranging from 15.2. wt % to 30.2 wt %, based upon the total weight of xylene soluble fraction; and
vii) $C^{13}$ NMR sequences PEP measured on the fraction insoluble in xylene at 25° C. ranging from 3.5 mol % to 5.5 mol % and $C^{13}$ NMR sequences PEP measured on the fraction soluble in xylene at 25° C. ranging from 11.0 mol % to 14.2 mol %.

DETAILED DESCRIPTION OF THE INVENTION

In some embodiments, the present disclosure provides a propylene ethylene copolymer having:
i) xylene soluble fraction at 25° C. ranging from 14 wt % to 27 wt %; alternatively from 17 wt % to 25 wt %; alternatively from 18 wt % to 22 wt %, based upon the total weight of the propylene ethylene copolymer;
ii) intrinsic viscosity of the fraction soluble in xylene at 25° C. ranging from 1.0 to 2.4 dl/g; alternatively from 1.5 to 2.2 dl/g; alternatively from 1.7 to 2.1 dl/g;
iii) melt flow rate, MFR, measured according to ISO 1133 at 230° C. with a load of 2.16 kg, ranging from 1.0 g/10 min to 50.0 g/10 min; alternatively from 1.4 g/10 min to 20.2 g/10 min; alternatively from 1.6 g/10 min to 4.0 g/10 min;
iv) an ethylene derived units content ranging from 5.0 wt % to 12.0 wt %, based upon the total weight of the propylene ethylene copolymer;
v) the ethylene derived units content on the fraction insoluble in xylene at 25° C. ranging from 2.5 wt % to 6.0 wt %; alternatively ranging from 3.2 wt % to 5.2 wt %; alternatively ranging from 3.5 wt % to 5.0 wt %, based upon the total weight of xylene insoluble fraction;
vi) the ethylene derived units content on the fraction soluble in xylene at 25° C. ranging from 15.2. wt % to 30.2 wt %; alternatively ranging from 17.2 wt % to 24.8 wt %; alternatively ranging from 18.2 wt % to 22.8 wt %, based upon the total weight of xylene soluble fraction; and
vii) $C^{13}$ NMR sequences PEP measured on the fraction insoluble in xylene at 25° C. ranging from 3.5 mol % to 5.5 mol %; alternatively ranging from 3.8 mol % to 5.2 mol %; alternatively ranging from 3.9 mol % to 4.8 mol % and $C^{13}$ NMR sequences PEP measured on the fraction soluble in xylene at 25° C. ranging from 11.0 mol % to 14.2 mol %; alternatively ranging from 11.5 mol % to 13.8 mol %; alternatively ranging from 12.3 mol % to 13.5 mol %.

As used herein, the term "copolymer" refers to polymers containing two kinds of comonomers. In some embodiments, the comonomers are propylene and ethylene.

In some embodiments and in the propylene ethylene copolymer, the $C^{13}$ NMR sequences PEE measured on the fraction soluble in xylene at 25° C. range from 7.2 mol % to 12.0 mol %; alternatively from 8.3 mol % to 11.2 mol %.

In some embodiments and in the propylene ethylene copolymer, the $C^{13}$ NMR sequences EEE measured on the fraction soluble in xylene at 25° C. are lower than 6.5 mol %; alternatively in a range from 5.9 mol % to 2.0 mol %.

In some embodiments and in the propylene ethylene copolymer, the ratio r1/r2 of the fraction insoluble in xylene at 25° C. measured with $C^{13}$ NMR is between 2.4 and 4.6; alternatively between 2.9 and 4.1; alternatively between 3.1 and 3.8.

Propylene ethylene copolymer is obtained with a process being carried out in a reactor having two interconnected polymerization zones, a riser and a downcomer, wherein growing polymer particles:
(a) flow through the first polymerization zone, the riser, under fast fluidization conditions in the presence of propylene and of ethylene;
(b) leave the riser and enter the second of polymerization zone, the downcomer, through which the growing polymer particles flow downward in a densified form in the presence of propylene and of ethylene, wherein the concentration of ethylene in the downcomer is higher than in the riser; and
(c) leave the downcomer and are reintroduced into the riser, thereby establishing a circulation of polymer between the riser and the downcomer.

In the first polymerization zone (riser), fast fluidization conditions are established by feeding a gas mixture made from or containing one or more alpha-olefins at a velocity higher than the transport velocity of the polymer particles. In some embodiments, the velocity of the gas mixture is between 0.5 and 15 m/s, alternatively between 0.8 and 5 m/s.

As used herein, the terms "transport velocity" and "fast fluidization conditions" are as defined in "D. Geldart, Gas Fluidisation Technology, page 155 et seq., J. Wiley & Sons Ltd., 1986".

In the second polymerization zone (downcomer), the polymer particles flow under the action of gravity in a densified form, thereby achieving the high values of density of the solid (mass of polymer per volume of reactor) and approaching the bulk density of the polymer. As used herein, the term "densified form" of the polymer indicates that the ratio between the mass of polymer particles and the reactor volume is higher than 80% of the "poured bulk density" of the polymer. In the downcomer, the polymer flows downward in a plug flow and small quantities of gas are entrained with the polymer particles.

In some embodiments, the two interconnected polymerization zones are operated such that the gas mixture coming from the riser is totally or partially prevented from entering the downcomer by introducing into the upper part of the downcomer, a liquid or gas stream, denominated "barrier stream", having a composition different from the gaseous mixture present in the riser. In some embodiments, one or more feeding lines for the barrier stream are placed in the downcomer close to the upper limit of the volume occupied by the polymer particles flowing downward in a densified form.

In some embodiments, this liquid/gas mixture fed into the upper part of the downcomer partially replaces the gas mixture entrained with the polymer particles entering the downcomer. The partial evaporation of the liquid in the barrier stream generates in the upper part of the downcomer a flow of gas, which moves counter-currently to the flow of descending polymer, thereby acting as a barrier to the gas mixture coming from the riser and entrained among the polymer particles. In some embodiments, the liquid/gas barrier fed to the upper part of the downcomer is sprinkled over the surface of the polymer particles. In some embodiments, the evaporation of the liquid provides the upward flow of gas.

In some embodiments, the feed of the barrier stream causes a difference in the concentrations of monomers or hydrogen (molecular weight regulator) inside the riser and the downcomer, thereby producing a bimodal polymer.

In some embodiments, the gas-phase polymerization process involves a reaction mixture made from or containing the gaseous monomers, inert polymerization diluents and chain transfer agents to regulate the molecular weight of the polymeric chains. In some embodiments, hydrogen is used to regulate the molecular weight. In some embodiments, the polymerization diluents are selected from C2-C8 alkanes, alternatively propane, isobutane, isopentane and hexane. In some embodiments, propane is used as the polymerization diluent in the gas-phase polymerization.

In some embodiments, the barrier stream is made from or contains:
  i. from 10 to 100% by mol of propylene, based upon the total moles in the barrier stream;
  ii. from 0 to 80% by mol of ethylene, based upon the total moles in the barrier stream;
  iii. from 0 to 30% by mol of propane, based upon the total moles in the barrier stream; and
  iv. from 0 to 5% by mol of hydrogen, based upon the total moles in the barrier stream.

In some embodiments, the composition of the barrier stream is obtained from the condensation of a part of the fresh monomers and propane, wherein the condensed part is fed to the upper part of the downcomer in a liquid form. In some embodiments, the composition of the barrier stream is derived from condensation or distillation of part of a gaseous stream continuously recycled to the reactor having two interconnected polymerization zones.

In some embodiments, additional liquid or gas is fed along the downcomer at a point below the barrier stream.

In some embodiments, the recycle gas stream is withdrawn from a gas/solid separator placed downstream the riser, cooled by passage through an external heat exchanger and then recycled to the bottom of the riser. In some embodiments, the recycle gas stream is made from or contains the gaseous monomers, the inert polymerization components, and chain transfer agents. In some embodiments, the inert polymerization components include propane. In some embodiments, the chain transfer agents include hydrogen. In some embodiments, the composition of the barrier stream deriving from condensation or distillation of the gas recycle stream is adjusted by feeding liquid make-up monomers and propane before the gas recycle stream's introduction into the upper part of downcomer.

In some embodiments and in both riser and downcomer, the temperature is between 60° C. and 120° C. while the pressure ranges from 5 to 40 bar.

In some embodiments, the process for preparing the propylene ethylene copolymer is carried out in presence of a highly stereospecific heterogeneous Ziegler-Natta catalyst. In some embodiments, the Ziegler-Natta catalysts are made from or contain a solid catalyst component made from or containing at least one titanium compound having at least one titanium-halogen bond and at least an electron-donor compound (internal donor), both supported on magnesium chloride. In some embodiments, the Ziegler-Natta catalysts systems are further made from or containing an organo-aluminum compound as a co-catalyst and optionally an external electron-donor compound.

In some embodiments, the catalysts systems are as described in the European Patent Nos. EP45977, EP361494, EP728769, and EP 1272533 and Patent Cooperation Treaty Publication No. WO0163261.

In some embodiments, the organo-aluminum compound is an alkyl-Al selected from the trialkyl aluminum compounds. In some embodiments, the trialkyl aluminum compound is selected from the group consisting of triethylaluminum, triisobutylaluminum, tri-n-butylaluminum, tri-n-hexylaluminum, and tri-n-octylaluminum. In some embodiments, the trialkylaluminum is mixed with alkylaluminum halides, alkylaluminum hydrides or alkylaluminum sesquichlorides such as $AlEt_2Cl$ and $Al_2Et_3Cl_3$.

In some embodiments, the external electron-donor compounds are selected from the group consisting of silicon compounds, ethers, esters, amines, heterocyclic compounds, ketones and the 1,3-diethers. In some embodiments, the ester is ethyl 4-ethoxybenzoate. In some embodiments, the external electron-donor compound is 2,2,6,6-tetramethyl piperidine. In some embodiments, the external donor compounds are silicon compounds of formula $R_a^5R_b^6Si(OR^7)_c$ where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. In some embodiments, the silicon compounds are selected from the group consisting of methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1,trifluoropropyl-methyldimethoxysilane. In some embodiments, the external electron donor compound is used in an amount to give a molar ratio between the organo-aluminum compound and the electron donor compound of from 0.1 to 500; alternatively from 1 to 100; alternatively from 2 to 50.

In some embodiments, the propylene ethylene copolymer is used for the production of films. In some embodiments, the films are selected from the group consisting of cast, BOPP and multilayer films. In some embodiments, the films are used for the packaging of fresh foodstuff, like salad and vegetables.

In some embodiment, the propylene ethylene copolymer is used for the production of injection molded articles.

In some embodiments, the propylene ethylene copolymer is further made from or containing additives. In some embodiments, the additives are selected from the group consisting of anti-oxidants, process stabilizers, slip agents, antistatic agents, antiblock agents, nucleating agents and antifog agents.

The following examples are given to illustrate, not to limit, the present disclosure:

EXAMPLES

Xylene-soluble (XS) Fraction at 25° C.

Xylene Solubles at 25° C. have been determined according to ISO 16 152; with solution volume of 250 ml, precipitation at 25° C. for 20 minutes, including 10 minutes with the solution in agitation (magnetic stirrer), and drying at 70° C.

Melt Flow Rate (MFR)

Measured according to ISO 1133 at 230° C. with a load of 2.16 kg, unless otherwise specified.

Intrinsic Viscosity (IV)

The sample was dissolved in tetrahydronaphthalene at 135° C. and then poured into a capillary viscometer. The viscometer tube (Ubbelohde type) was surrounded by a cylindrical glass jacket, which permitted temperature control with a circulating thermostatic liquid. The downward passage of the meniscus was timed by a photoelectric device.

The passage of the meniscus in front of the upper lamp started the counter, which had a quartz crystal oscillator. The counter stopped as the meniscus passed the lower lamp and the efflux time was registered. The efflux time was converted into a value of intrinsic viscosity through Huggins' equation (Huggins, M. L., J. Am. Chem. Soc., 1942, 64, 2716), based upon the flow time of the solvent at the same experimental conditions (same viscometer and same temperature). A single polymer solution was used to determine [η].

Determination of the Haze

Multilayer film specimens were prepared. The haze value was measured using a Gardner photometric unit connected to a Hazemeter type UX-10 or an equivalent instrument having G.E. 1209 light source with filter "C". Reference samples were used for calibrating the instrument according to ASTM D1003.

Ethylene Content in the Copolymers $^{13}C$ NMR spectra were acquired on a Bruker AV-600 spectrometer equipped with cryoprobe, operating at 160.91 MHz in the Fourier transform mode at 120° C.

The peak of the Sββ carbon (nomenclature according to "Monomer Sequence Distribution in Ethylene-Propylene Rubber Measured by $^{13}C$ NMR. 3. Use of Reaction Probability Mode" C. J. Carman, R. A. Harrington and C. E. Wilkes, Macromolecules, 1977, 10, 536) was used as an internal reference at 29.9 ppm. The samples were dissolved in 1,1,2,2-tetrachloroethane-d2 at 120° C. with an 8% wt/v concentration. Each spectrum was acquired with a 90° pulse, and 15 seconds of delay between pulses and CPD to remove $^1H$-$^{13}C$ coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150) using the following equations:

PPP = 100 Tββ/S   PPE = 100 Tβδ/S   EPE = 100 Tδδ/S
PEP = 100 Sββ/S   PEE = 100 Sβδ/S   EEE = 100 (0.25 Sγδ + 0.5 Sδδ)/S
S = Tββ + Tβδ + Tδδ + Sββ + Sβδ + 0.25 Sγδ + 0.5 Sδδ

The molar percentage of ethylene content was evaluated using the following equation:

$E \% \, mol = 100 * [PEP + PEE + EEE]$

The weight percentage of ethylene content was evaluated using the following equation:

$100 * E \% \, mol * MWE$ $E \% \, wt. = E \% \, mol * MWE + P \% \, mol * MWP$ where P % mol is the molar percentage of propylene content, while MWE and MWP are the molecular weights of ethylene and propylene, respectively.

The product of reactivity ratio r1r2 was calculated according to Carman (C. J. Carman, R. A. Harrington and C. E. Wilkes, Macromolecules, 1977; 10, 536) as:

$$r_1 r_2 = 1 + \left(\frac{EEE + PEE}{PEP} + 1\right) - \left(\frac{P}{E} + 1\right)\left(\frac{EEE + PEE}{PEP} + 1\right)^{0.5}$$

The tacticity of Propylene sequences was calculated as mm content from the ratio of the PPP mmT$_{ββ}$ (28.90-29.65 ppm) and the whole T$_{ββ}$ (29.80-28.37 ppm).

Oxygen Transmission (OTR)

Measured on a Mocon OX-TRAN 2/60 unit, commercially available from Mocon, Inc., according to ASTM D3985-05(2010)e1 at 23° C., 0% relative humidity (RH), and 100% $O_2$.

Water Vapor Transmission (WVTR)

Measured on a Mocon PERMATRAN W3/33 unit, commercially available from Mocon, Inc. according to ASTM F1249 at 37.8° C. and 90% relative humidity (RH).

Tensile Modulus

Tensile modulus was measured by using a Dynamic Mechanical Thermal Analyzer (DMTA). DMTA was calibrated by using the calibration standards according to the manufacturer's instruction manual and internal reference material.

Injection molded specimens of the polymer to be measured were prepared according to ISO 527-2, and ISO 1873-2.

Specimens were conditioned after molding for at least 40 h at +23° C.+/−2° C. and 50% of relative humidity. A sample 50×6×1 mm was cut. A sample was loaded in the sample fixture, cooled down below glass transition temperature and then held at this temperature for 15 min. The sample was heated up to softening point at 2° C./min and 1 Hz of frequency of oscillation.

5 tests were performed for each polymer and the average results are given as tensile modulus.

Example 1

Preparation of the Ziegler-Natta Solid Catalyst Component

The Ziegler-Natta catalyst was prepared as described for Example 5, lines 48-55, of European Patent No. EP728769B1.

Preparation of the Catalyst System—Precontact

Before introducing the solid catalyst component into the polymerization reactors, the solid catalyst component was contacted with aluminum-triethyl (TEAL) and with the dicyclopentyldimethoxysilane (D donor) under the conditions reported in Table 1.

Prepolymerization

The catalyst system was then subjected to prepolymerization treatment at 20° C. by maintaining the catalyst system in suspension in liquid propylene for a residence time of 9 minutes before introducing the catalyst system into the polymerization reactor.

Polymerization

The polymerization was carried out in gas-phase polymerization reactor including two interconnected polymerization zones, a riser and a downcomer, as described in European Patent No. EP782587. Hydrogen was used as molecular weight regulator. The polymer particles exiting from the polymerization step were subjected to a steam treatment to remove the unreacted monomers and dried under a nitrogen flow.

The main precontact, prepolymerization and polymerization conditions and the quantities of monomers and hydrogen fed to the polymerization reactor are reported in Table 1.

TABLE 1

| Example 1 | | |
|---|---|---|
| PRECONTACT | | |
| Temperature | ° C. | 15 |
| Residence Time | min | 13 |
| TEAL/catalyst | wt/wt | 6 |
| TEAL/Ext. Donor | g/g | 4 |
| PREPOLYMERIZATION | | |
| Temperature | ° C. | 20 |
| Residence Time | min | 8 |
| POLYMERIZATION | | |
| Temperature | bar-g | 65 |
| Pressure | bar-g | 24 |
| Residence Time | min | 120 |
| Mileage | kg/kg | 37000 |
| Split holdup riser | wt % | 40 |
| Split holdup downcomer | wt % | 60 |
| $C_2^-/C_2^- + C3^-$ riser | mol/mol | 0.018 |
| $C_2^-/C_2^- + C3^-$ downcomer | mol/mol | 0.041 |
| $H_2/C_3^-$ riser | mol/mol | 0.023 |
| $H_2/C_2^-$ downcomer | mol/mol | 0.23 |

H2 = hydrogen;
C2- = ethylene,
C3- = propylene

Comparative Examples 2 and 3

Comparative example 2 was obtained by blending 30% of Adflex C200F propylene copolymer commercially available from LyondellBasell and 70% of Moplen RP320M propylene random copolymer commercially available from LyondellBasell.

Comparative example 3 was Adflex C200F propylene copolymer commercially available from LyondellBasell.

The properties of the polymer of example 1 and comparative examples 2 and 3 are reported in Table 2.

TABLE 2

| Ex | | 1 | Comp 2 | Comp 3 |
|---|---|---|---|---|
| Ethylene content | Wt % | 7.6 | 6.6 | 14.9 |
| Xylene soluble at 25° C. | Wt % | 19.4 | 19.4 | 51.2 |
| Intrinsic viscosity xylene solubles | dl/g | 1.94 | 1.96 | 2.24 |
| MFR | g/10 min | 1.8 | | 6.0 |
| Ethylene in the fraction insoluble in xylene at 25° C. | Wt % | 4.3 | 3.1 | 6.2 |
| Ethylene in the fraction soluble in xylene at 25° C. | Wt % | 20.1 | 25.0 | 24 |
| PEP sequences in the fraction insoluble in xylene at 25° C. | Mol % | 4.3 | 3.1 | 3.7 |
| PEP sequences in the fraction soluble in xylene at 25° C. | Mol % | 12.9 | 12.3 | 12.1 |
| PEE sequences in the fraction soluble in xylene at 25° C. | Mol % | 9.7 | 12.7 | 12.5 |
| EEE sequences in the fraction soluble in xylene at 25° C. | Mol % | 4.8 | 8.4 | 7.7 |
| r1r2 in the fraction insoluble in xylene at 25° C. | | 3.6 | 5.4 | 6.8 |
| tensile modulus (DMTA) | MPa | 738 | 889 | Not measured |

Blends 1-2 Comparative Blends 3-4

The polymers of example 1 and comparative example 3 were blended in various percentages with Moplen HP522H propylene homopolymer commercially available from LyondellBasell, having a MFR of 2.0 g/10 min and a solubility in xylene at 25° C. of 4.9 as reported in Table 3:

TABLE 3

| components | | blend 1 | blend 2 | blend 3 | blend 4 |
|---|---|---|---|---|---|
| HP522H | Wt % | 70 | 70 | 60 | 60 |
| Ex 1 | Wt % | 30 | | 40 | |
| Comp ex. 3 | Wt % | | 30 | | 40 |

BOPP A/B/A films were produced. The B layer was made with blends 1-4 while the A layer was Moplen HP522H propylene homopolymer commercially available from LyondellBasell. The thickness of the films was 30 microns, with the A layer being 1 micron. The results of the analysis of the films are reported in Table 4.

TABLE 4

| components | | blend 1 | blend 2 | blend 3 | blend 4 |
|---|---|---|---|---|---|
| WVTR | cc/m² × day | 5.97 | 6.44 | 6.1 | 6.99 |
| OTR | cc/m² × day | 2338 | 2394 | 2485 | 3359 |
| haze | % | 1.67 | 5.20 | 2.30 | 6.32 |

What is claimed is:

1. A propylene ethylene copolymer having:
   i) xylene soluble fraction at 25° C. ranging from 14 wt. % to 27 wt. %, based upon the total weight of the propylene ethylene copolymer;
   ii) intrinsic viscosity of the fraction soluble in xylene at 25° C. ranging from 1.0 to 2.4 dl/g;
   iii) melt flow rate, MFR, measured according to ISO 1133 at 230 ° C. with a load of 2.16 kg, ranging from 1.0 g/10 min to 50.0 g/10 min;
   iv) an ethylene derived units content ranging from 5.0 wt. % to 12.0 wt. %, based upon the total weight of the propylene ethylene copolymer;
   v) the ethylene derived units content on the fraction insoluble in xylene at 25° C. ranging from 2.5 wt. % to 6.0 wt. %, based upon the total weight of xylene insoluble fraction;
   vi) the ethylene derived units content on the fraction soluble in xylene at 25° C. ranging from 15.2. wt. % to 30.2 wt. %, based upon the total weight of xylene soluble fraction; and
   vii) $C^{13}$ NMR sequences PEP measured on the fraction insoluble in xylene at 25° C. ranging from 3.5 mol. % to 5.5 mol. % and $C^{13}$ NMR sequences PEP measured on the fraction soluble in xylene at 25° C. ranging from 11.0 mol. % to 14.2 mol. %.

2. The propylene ethylene copolymer according to claim 1, wherein the xylene soluble fraction at 25° C. ranges from 17 wt. % to 25 wt. %, based upon the total weight of the propylene ethylene copolymer.

3. The propylene ethylene copolymer according to claim 1, wherein the intrinsic viscosity of the fraction soluble in xylene at 25° C. ranges from 1.5 to 2.2 dl/g.

4. The propylene ethylene copolymer according to claim 1, wherein the melt flow rate, MFR, measured according to ISO 1133 at 230° C. with a load of 2.16 kg, ranges from 1.4 g/10 min to 20.2 g/10 min.

5. The propylene ethylene copolymer according to claim 1, wherein the melt flow rate, MFR, measured according to ISO 1133 at 230° C. with a load of 2.16 kg, ranges from 1.6 g/10 min to 4.0 g/10 min.

6. The propylene ethylene copolymer according to claim 1, wherein the ethylene derived units content on the fraction insoluble in xylene at 25° C. ranges from 3.2 wt. % to 5.2 wt. %.

7. The propylene ethylene copolymer according to claim 1, wherein the ethylene derived units content on the fraction soluble in xylene at 25° C. ranges from 17.2 wt. % to 24.8 wt. %.

8. The propylene ethylene copolymer according to claim 1, wherein the $C^{13}$ NMR sequences PEP measured on the fraction insoluble in xylene at 25° C. ranges from 3.8 mol. % to 5.2 mol. %; and the $C^{13}$ NMR sequences PEP measured on the fraction soluble in xylene at 25° C. ranges from 11.5 mol. % to 13.8 mol. %.

9. The propylene ethylene copolymer according to claim 1, wherein the $C^{13}$ NMR sequences PEP measured on the fraction insoluble in xylene at 25° C. ranges 3.9 mol. % to 4.8 mol. %; and the $C^{13}$ NMR sequences PEP measured on the fraction soluble in xylene at 25° C. ranges 12.3 mol. % to 13.5 mol. %.

10. The propylene ethylene copolymer according to claim 1, wherein the $C^{13}$ NMR sequences PEE measured on the fraction soluble in xylene at 25° C. range from 7.2 mol. % to 12.0 mol. %.

11. The propylene ethylene copolymer according to claim 1, wherein the $C^{13}$ NMR sequences EEE measured on the fraction soluble in xylene at 25° C. are lower than 6.5 mol. %.

* * * * *

UNITED STATES PATENT AND TRADEMARK OFFICE
CERTIFICATE OF CORRECTION

PATENT NO. : 11,186,664 B2
APPLICATION NO. : 16/647672
DATED : November 30, 2021
INVENTOR(S) : Massari et al.

It is certified that error appears in the above-identified patent and that said Letters Patent is hereby corrected as shown below:

On the Title Page

Column 1, Item (30), under 'Foreign Application Priority Data', Line 1, delete "17190989" and insert -- 17190989.8 --, therefor Column 1, Item (30), under 'Foreign Application Priority Data', Line 2, delete "18177535" and insert -- 18177535.4 --, therefor In the Specification In Column 1, Line 3, after "PROPYLENE ETHYLENE RANDOM COPOLYMER" insert -- This application is the U.S. National Phase of PCT International Application PCT/EP2018/073313, filed August 30, 2018, claiming benefit of priority to European Patent Application No. 17190989.8, filed September 14, 2017 and European Patent Application No. 18177535.4, filed June 13, 2018, the contents of which are incorporated herein by reference in its entirety. --

Signed and Sealed this
Twenty-fourth Day of January, 2023

Katherine Kelly Vidal
*Director of the United States Patent and Trademark Office*